US009745901B2

(12) United States Patent
Albert et al.

(10) Patent No.: US 9,745,901 B2
(45) Date of Patent: Aug. 29, 2017

(54) VALVE COMPRISING A MOVEMENT TRANSFORMATION DEVICE

(75) Inventors: Laurent Albert, Verderie (FR); Gabriel Ridolfi, Hacqueville (FR)

(73) Assignee: Valeo Systemes de Controle Moteur, Cergy Pontoise (FR)

( * ) Notice: Subject to any disclaimer, the term of this patent is extended or adjusted under 35 U.S.C. 154(b) by 784 days.

(21) Appl. No.: 13/378,372

(22) PCT Filed: Jun. 17, 2010

(86) PCT No.: PCT/EP2010/058549
§ 371 (c)(1),
(2), (4) Date: Feb. 22, 2012

(87) PCT Pub. No.: WO2010/146121
PCT Pub. Date: Dec. 23, 2010

(65) Prior Publication Data

US 2012/0138029 A1 Jun. 7, 2012

(30) Foreign Application Priority Data

Jun. 17, 2009 (FR) ..................................... 09 02949

(51) Int. Cl.

| | |
|---|---|
| ***F16K 31/528*** | (2006.01) |
| ***F02D 9/12*** | (2006.01) |
| ***F02D 11/04*** | (2006.01) |
| ***F02D 11/06*** | (2006.01) |
| ***F02D 11/10*** | (2006.01) |
| ***F02M 26/54*** | (2016.01) |

(52) U.S. Cl.
CPC ................ *F02D 9/12* (2013.01); *F02D 11/04* (2013.01); *F02D 11/06* (2013.01); *F02D 11/105* (2013.01); *F02M 26/54* (2016.02)

(58) Field of Classification Search
CPC ........... F02M 25/0773; F02M 25/0789; Y02T 10/121; B60R 2021/26094; B60R 21/268; F01L 13/06; F01L 1/024; F01L 2009/0411; F01L 9/04; H02K 7/06; F16K 31/04; F16H 2025/2075; F16H 25/2015; F16H 25/2204; F16H 25/24
USPC ........ 123/90.12, 90.15, 90.16, 90.48; 222/54
See application file for complete search history.

(56) References Cited

U.S. PATENT DOCUMENTS

| | | | | |
|---|---|---|---|---|
| 3,046,802 A * | 7/1962 | Cupedo | F15B 15/068 | 251/162 |
| 3,756,575 A * | 9/1973 | Cottell | 261/1 | |
| 4,097,786 A * | 6/1978 | Lund | 318/282 | |

(Continued)

FOREIGN PATENT DOCUMENTS

| | | |
|---|---|---|
| DE | 10 2007 037359 A1 | 2/2009 |
| EP | 1 375 892 A1 | 1/2004 |

OTHER PUBLICATIONS

International Search Report w/translation from PCT/EP2010/058549 dated Aug. 4, 2010 (4 pages).

*Primary Examiner* — Hai Huynh
*Assistant Examiner* — Gonzalo Laguarda
(74) *Attorney, Agent, or Firm* — Osha Liang LLP

(57) ABSTRACT

The invention relates to an engine control valve (1) which comprises a rotatable actuator (7), a valve (5), and a movement transformation device (9) suitable for transforming the rotation of the actuator (7) into translation of the valve (5). The movement transmission device (9) comprises a helical link with uniform pitch for translating the valve (5).

14 Claims, 2 Drawing Sheets

(56) References Cited

U.S. PATENT DOCUMENTS

| | | | | |
|---|---|---|---|---|
| 4,592,310 | A * | 6/1986 | Hitomi et al. | 123/184.55 |
| 5,186,128 | A * | 2/1993 | Murata et al. | 123/90.16 |
| 5,318,064 | A * | 6/1994 | Reinicke | 137/487.5 |
| 5,485,760 | A * | 1/1996 | Lange | 74/89.25 |
| 5,592,907 | A * | 1/1997 | Hasebe et al. | 123/90.16 |
| 5,606,957 | A * | 3/1997 | Feucht | 123/568.23 |
| 5,675,969 | A * | 10/1997 | Satoh | 60/324 |
| 5,784,922 | A * | 7/1998 | Ozaki et al. | 74/89.37 |
| 6,184,603 | B1 * | 2/2001 | Hamai et al. | 310/75 R |
| 6,516,760 | B2 * | 2/2003 | Buglioni | 123/90.16 |
| 6,534,793 | B1 * | 3/2003 | Heritier-Best | F16K 31/04<br>251/129.11 |
| 6,840,200 | B2 * | 1/2005 | Miller | 123/90.11 |
| 7,762,526 | B2 * | 7/2010 | Coleman | F16K 3/10<br>251/187 |
| 9,212,760 | B2 * | 12/2015 | Thorpe | F16K 31/5286 |
| 2004/0069285 | A1 * | 4/2004 | Telep | F02M 25/0773<br>123/568.23 |
| 2007/0107706 | A1 | 5/2007 | Berggren et al. | |
| 2008/0202455 | A1 * | 8/2008 | Diggs | 123/90.15 |

* cited by examiner

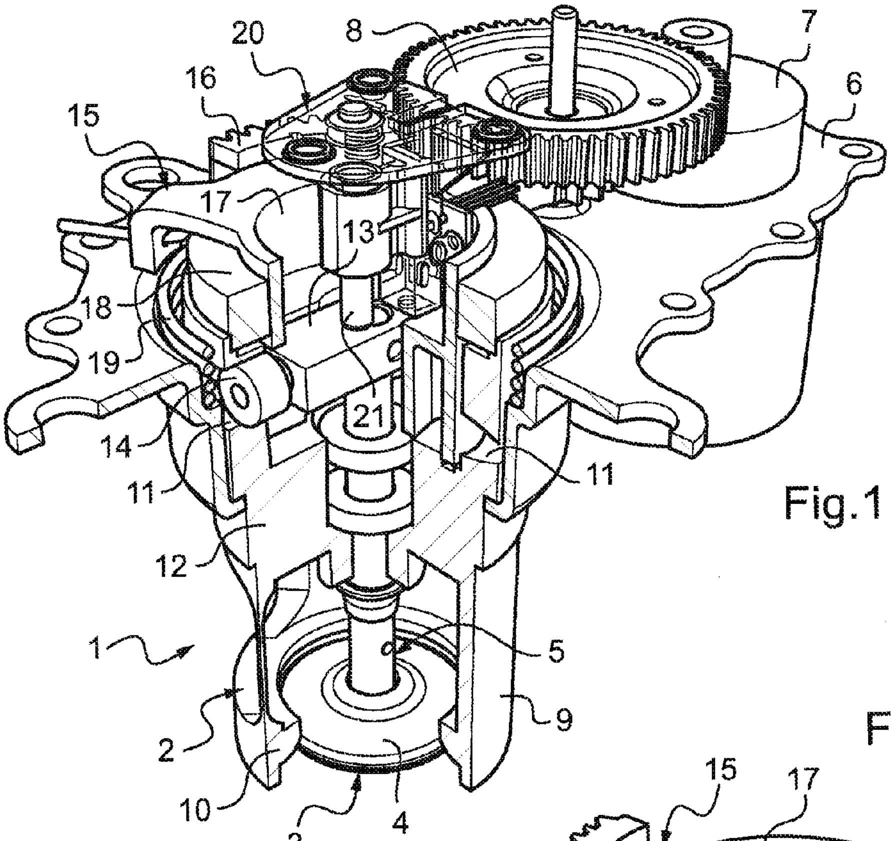
Fig.1
Fig.3
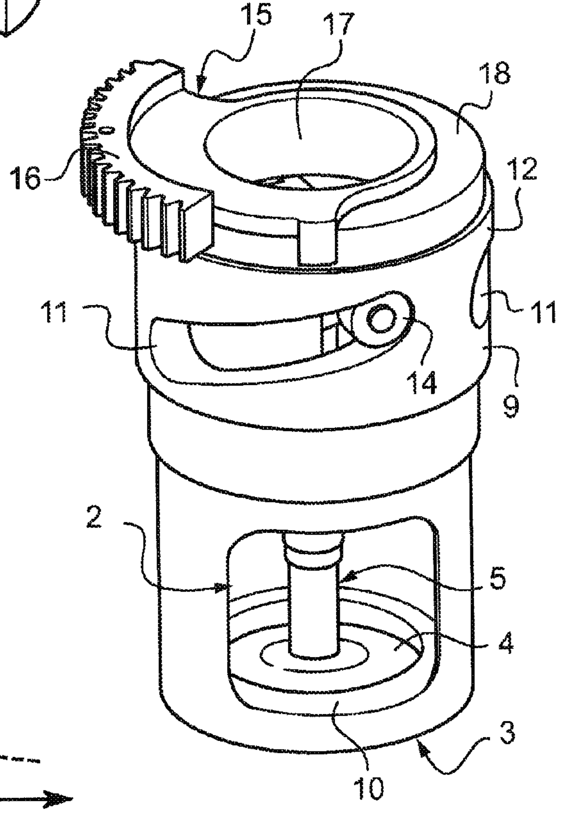
Fig.4
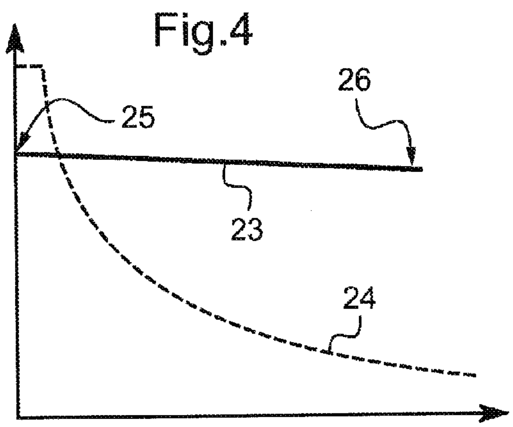

VALVE COMPRISING A MOVEMENT TRANSFORMATION DEVICE

The invention relates to the field of automotive vehicles. It relates more specifically to an engine control valve designed to manage the flow of a fluid in a pipe connected to the engine of the vehicle.

BACKGROUND OF THE INVENTION

Engine control valves which are actuated by a rotary motor and designed to bring about a translational movement of a valve shutter arranged in a pipe and which are able to control the passage of a fluid through this pipe are known. These valves comprise an electric motor associated with a gearset allowing a cam system to be rotated. The translational movement generated allows the valve shutter to be driven in a rectilinear movement.

OBJECT OF THE INVENTION

It is an object of the invention to improve this type of valve by proposing an engine control valve the control of which is easier and more robust.

BRIEF DESCRIPTION OF THE INVENTION

To this end, the invention is aimed at an engine control valve comprising a rotary actuator, a valve shutter and a movement conversion device designed to convert the rotational movement of the actuator into a translational movement of the valve shutter, characterized in that the movement conversion device comprises a constant-pitch helical connection for driving the translational movement of the valve shutter.

Thanks to this configuration, the translational drive of the valve shutter by the movement conversion device is according to a substantially linear law, which means to say that the axial force exerted on the valve shutter in order to open it varies, according to the valve lift and therefore according to the rotation of the actuator, and these variations can be represented by a substantially straight line. This does not allow a significant stepping down of the force applied to the valve shutter from the start of the valve lift phase (when the forces that have to be overcome are the greatest), as is commonly performed in valves of the prior art in which the force decreases rapidly after the start of valve lift (see FIG. 4, curve drawn in dotted line) in a connection the pitch of which is not constant, or even which has a double slope.

The valve according to the invention for its part enjoys a conversion device that behaves in a linear manner and is therefore easier to control.

At the very start of valve lift, the pressure forces of the fluid flowing through the valve are the greatest. As the magnitude of the forces to be overcome in order to cause valve lift is directly dependent on the initial position of the valve shutter, not concentrating the application of force at the start of valve lift runs counter to common wisdom which is to distribute this force according to the apparent need, which means to say concentrated at the start and then dropping off rapidly.

This valve may further comprise the following features, alone or in combination:

- the helical connection comprises a camway of constant pitch;
- the movement conversion device comprises a tubular wall in which the camway is formed;

- the camway comprises two tracks arranged facing one another on the tubular wall;
- the valve comprises at least one follower attached to the valve shutter and designed to collaborate with the camway;
- said at least one follower is mounted to rotate on a bar attached to the valve shutter, the bar being arranged in the volume delimited by the tubular wall so as to collaborate with an input wheel which is driven by the rotary actuator and which is designed to rotate the bar;
- the input wheel can be driven directly or indirectly by the rotary actuator;
- the input wheel is mounted to rotate on the tubular wall;
- the input wheel is mounted to rotate on the tubular wall via a rolling bearing;
- a position sensor that senses the position of the valve shutter is positioned in the space delimited by the tubular wall;
- the position sensor is a linear-displacement transducer. The use of a linear-displacement transducer is more advantageous than the use of a rotary sensor because it directly measures the displacement of the valve shutter. This sensor here in fact behaves in a substantially linear manner because it is directly associated with the element (the valve shutter) the position of which is to be determined, without any stepping down or conversion of movement. In valves of the prior art, rotary sensors are generally used to determine the angular position of a cam that acts on the valve shutter and indirectly therefrom deduce the position of the valve shutter by taking the shape of said cam into consideration. In these valves, a linear-displacement transducer would in fact behave in a nonlinear manner. What is meant by "behave in a substantially linear manner" is, for an element of the valve, to behave physically like a linear system theoretical model, within the meaning that this has in the fields of automation and signal processing;
- the rotary actuator comprises an electric motor that behaves in a substantially linear manner;
- this motor is a DC motor;
- the rotary actuator is connected to the movement conversion device by transmission means which behave in a substantially linear manner;
- the valve comprises return means that return the valve shutter to the closed position, these return means behaving in a substantially linear manner;
- the elastic return means comprise a helical torsion spring;
- the drive train from the rotary actuator to the valve shutter is made up of elements that behave in a substantially linear manner.

Another aspect of the invention targets an assembly of such a valve shutter with control means programmed to a linear model.

The control means may comprise conventional electronic devices such as an engine control unit (or ECU).

They are programmed to a linear model, which means that the transfer function of the model which describes the position of the valve shutter as a function of the input command is a linear function.

BRIEF DESCRIPTION OF THE DRAWINGS

The invention will be better understood in the light of the description which follows of one preferred and nonlimiting embodiment, which description is given with reference to the attached drawings, among which:

FIG. 1 is a perspective view of a valve according to the invention;

FIG. 3 is a perspective view of the movement conversion device of the valve of FIG. 1;

FIG. 4 is a graph showing the axial force applied to the valve shutter as a function of its valve lift travel in the valve of FIG. 1.

DETAILED DESCRIPTION OF THE INVENTION

Figure 2:
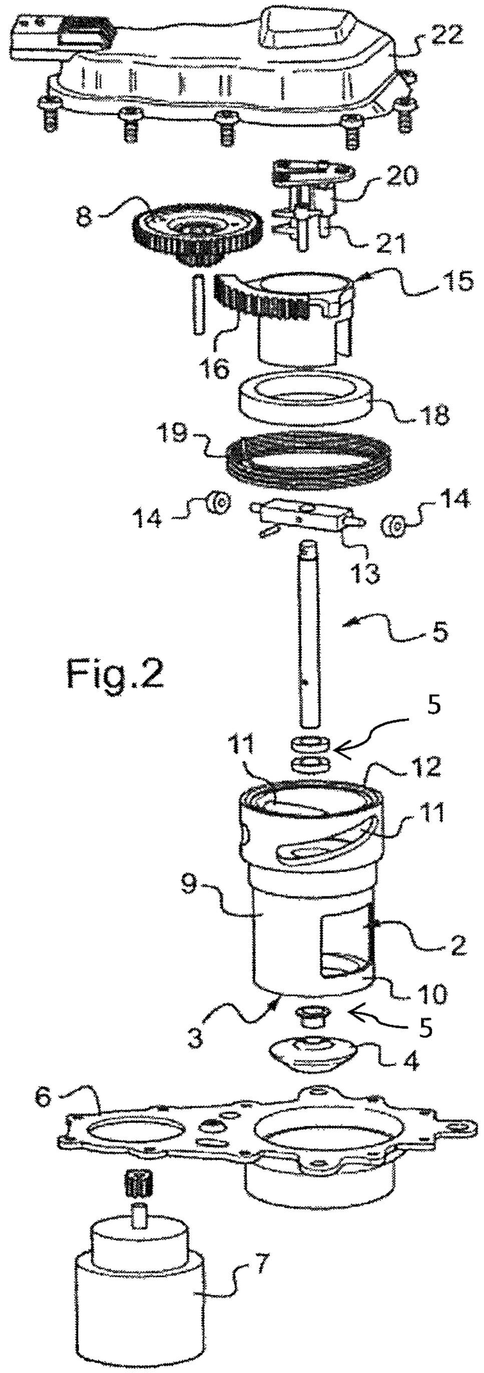
FIG. 2 is an exploded view of the valve of FIG. 1.

FIG. 1 depicts an engine control valve 1 which in this example is an exhaust gas recirculation valve commonly known as an EGR valve. The various elements that make up the valve 1 are visible separately in the exploded view of FIG. 2.

The valve 1 comprises a fluid inlet 2 and a fluid outlet 3 between which the head 4 of a valve shutter 5 is positioned. In the way that is conventional for an EGR valve, when the valve shutter 5 is in the closed position it shuts off the flow of fluid entering via the inlet 2 and leaving via the outlet 3. By contrast, when the valve shutter 5 is wide open it allows this fluid to flow freely, whereas when the valve shutter 5 is in an intermediate position it meters the fluid.

The valve 1 comprises a mount 6 on which there are mounted an actuator, here consisting of an electric motor or rotary actuator 7, a movement conversion device 9 and a transmission wheel 8 which allows the motor 7 to drive the movement conversion device 9, the latter converting the rotary movement of the transmission wheel 8 into a rectilinear movement of the valve shutter 5.

The movement conversion device 9 has a tubular overall shape and at one of its ends comprises a valve seat 10 and at the other of its ends comprises a camway or constant pitch helical connection 11. As an alternative, the valve may have no valve seat. In this example, the camway 11 comprises two tracks made in a tubular wall 12 of the movement conversion device 9. A bar 13 fixed to the valve shutter 5 and equipped with followers 14 is designed to follow the camway 11.

The movement conversion device 9 collaborates with an input wheel 15 comprising a toothed portion 16 attached to a tubular portion 17 mounted to rotate on the movement conversion device 9 via a rolling bearing 18.

Elastic return means 19 are provided here in the form of a helical torsion spring to return the input wheel 15 to one of its extreme angular positions corresponding, in this example, to the closed position of the valve shutter 5.

The motor 7 is therefore in this instance operated against the action of the return means 19 in order to open the valve shutter 5.

A position sensor 20 additionally allows the position of the valve shutter 5 along its axial travel to be measured at any moment, and does so via a feeler 21 kept in contact with the bar 13 by means of a spring (not depicted). The sensor 20 therefore behaves in a linear manner in so far as the feeler 21 [lacuna].

A protective cap 22 (see FIG. 2) mounted on the support 6 protects the rotary parts of the valve 1.

The motor 7 is powered and driven with inbuilt control in a way that is conventional to computation means (not depicted).

When the motor 7 is made to rotate, it drives the rotation of the transmission wheel 8 (and any other gearset that might be provided) which in turn turns the input wheel 15. The latter also drives the rotation of the bar 13 through complementary shapes (see FIG. 1), while leaving it free to effect axial translational movement. That causes the followers 14 to roll along the camway 11 (which is fixed, the movement conversion device 9 being fixed to the support 6) and therefore causes the joint translational movement of the bar 13 and of the valve shutter 5 in the axial direction, causing the valve shutter 5 to open or to close.

With reference to FIG. 4, the movement conversion device 9 is depicted outside the valve 1 here. In this figure, the input wheel 15 is in an angular position which:

- corresponds to an angular position of the bar 13;
- corresponds to a position of the followers 14 in the camway 11 (at the end of the track);
- corresponds to a position of the valve shutter (the closed position).

The camway 11 is configured so that the force exerted on the valve shutter 5 as it opens is substantially linear.

The movement conversion device 9 thus behaves in a way very similar to that of a linear system. A linear system is a system model which applies a linear (first order) operator to an input signal. A linear system typically displays characteristics and properties that are far simpler than the general non-linear case.

These linear properties improve the controllability of the system.

The axial force applied to the valve shutter varies in a linear or near-linear manner along the axial travel of the valve shutter 5. The curve 23 indicative of the axial force applied to the valve shutter 5 as a function of its axial travel (valve lift) is therefore substantially a straight line. In FIG. 4, this curve 23 is depicted in solid line whereas a conventional curve 24 relating to valves of the prior art is shown in dotted line.

For the same rotation of the motor 7, corresponding directly to a variation in angle of the bar 13, the variation in axial force applied to the valve shutter 5 thanks to collaboration between the camway 11 and the followers 14 is therefore substantially constant and is identical over the entire working rotational range of the motor 7.

In the example of FIG. 4, the variation in the axial force applied to the valve shutter 5 is not only constant but very small. By way of example, the force at the start of valve lift (point 25 in FIG. 4) may be 420 N while the force at the end of valve lift (point 26 in FIG. 4) may be 380 N, which represents a variation in force of around 10% over the entire valve lift travel of the valve shutter 5. By way of comparison, the order of magnitude of the variation in force for valves of the prior art is 1000% (see FIG. 4).

The curve 23 is therefore not only a straight line here but also nearly horizontal.

The camway 11 is, in the present example, made up of two tracks arranged face to face (diametrically opposite each other) on the tubular wall 12, each of these tracks being formed here of an open slot made in the tubular wall 12. The shape of the slot is a helicoid extending along the tubular wall 12. To obtain an axial valve lift force with constant variation, this helicoid in this example has a constant helix pitch (see FIG. 3).

Thus, by virtue of the movement conversion device 9, the way in which the valve 1 behaves when opened is substantially linear in the sense that a rotation of the motor 7 through a given angle will produce substantially the same variation in force on the valve shutter 5 whatever the position of the valve shutter 5. Because this variation is also reduced to a minimum here, rotating the motor 7 through a given angle will cause substantially the same force to be applied to the valve shutter 5, regardless of the position of the valve shutter 5.

Moreover, the substantially linear way in which the movement conversion device 9 behaves may be supplemented by other components of the drive train extending from the motor 7 to the valve shutter 5 and which likewise advantageously behave in a substantially linear manner.

The embodiment of the present example, which is particularly advantageous, contains in this drive train only elements which behave in a substantially linear manner. This drive train can therefore be modeled as a linear model with satisfactory results. This linear model is embedded in the electronic device selected to control the valve.

The motor 7 first of all in this instance is a DC motor, which means that it behaves in a substantially linear manner.

All the gearing that transmits the rotation of the motor 7 to the input wheel 15 also behaves in a substantially linear manner, which means to say that the teeth of the gearwheels (in this instance the wheels 8 and 15) are evenly distributed about the working circumference of said wheels.

Friction is also a source of non-linearity. The rolling bearing 18 here reduces this friction so that the system behaves even more like a linear system.

The helical torsion spring that makes up the return means 19 also here behaves in a substantially linear manner, which means to say that the rotation of the input wheel 15 is directly proportional to the torque that has caused this rotation (the torque applied by the transmission wheel). This manner of behaving is obtained by choosing a spring with a substantially constant spring rate.

The entire drive train from the motor 7 to the valve shutter 5 thus behaves in a substantially linear manner, thus making it more controllable.

The workload on the computation means (not depicted) for controlling the motor 7 is reduced here because, in order to get from a position instruction for the valve shutter 5 to the corresponding command for the motor 7, the computation means have linear equations to handle, which requires less computing power, better responsiveness and greater robustness. The control of the motor 7 is therefore linear in this instance, which means to say performed to a first-order linear model.

Other features of the valve 1 can be conceived of without thereby departing from the scope of the invention. In particular, the gearset from the motor 7 to the input wheel 15 may contain any number of gears or pinions.

The valve shutter can be any component that controls the flow (opens, closes and/or meters) using a member that undergoes a translational movement.

The invention claimed is:

1. An engine control valve comprising:

a rotary actuator;

a valve shutter with an open position and a closed position;

a movement conversion device configured to convert a rotational movement of the actuator into a translational movement of the valve shutter, wherein the movement conversion device comprises a constant-pitch helical connection for driving the translational movement of the valve shutter; and at least one follower attached to the valve shutter and configured to collaborate with a camway of constant pitch, wherein:

the helical connection comprises the camway, the movement conversion device further comprises a tubular wall in which the camway is formed, the camway comprises an open slot in the tubular wall, the open slot having a first end that limits the translational movement of the valve shutter in one of the open and closed positions, and a second end that limits the translational movement of the valve shutter in the other position, the slot having the shape of a helicoid extending along the tubular wall, the movement conversion device is monolithic, the at least one follower is mounted to rotate on a bar attached to the valve shutter, the bar being arranged in a volume delimited by the tubular wall so as to collaborate with an input wheel which is driven by the rotary actuator and which is designed to rotate the bar, and the at least one follower that is mounted to rotate on the bar is a wheel.

2. The valve as claimed in claim 1, wherein the camway comprises two tracks arranged facing one another on the tubular wall.

3. The valve as claimed in claim 1, wherein the input wheel is mounted to rotate on the tubular wall.

4. The valve as claimed in claim 3, wherein the input wheel is mounted to rotate on the tubular wall via a rolling bearing.

5. The valve as claimed in claim 1, wherein a position sensor that senses the position of the valve shutter is positioned in a space delimited by the tubular wall.

6. The valve as claimed in claim 5, wherein the position sensor is a linear-displacement transducer.

7. The valve as claimed in claim 1, wherein the rotary actuator comprises an electric motor that behaves in a substantially linear manner.

8. The valve as claimed in claim 7, wherein the electric motor is a DC motor.

9. The valve as claimed in claim 1, wherein the rotary actuator is connected to the movement conversion device by transmission means which behave in a substantially linear manner.

10. The valve as claimed in claim 1, wherein a drive train from the rotary actuator to the valve shutter is made up of elements that behave in a substantially linear manner.

11. An assembly comprising:

a valve comprising:

a rotary actuator, a valve shutter with an open position and a closed position, a movement conversion device configured to convert a rotational movement of the actuator into a translational movement of the valve shutter, wherein the movement conversion device comprises a constant-pitch helical connection for driving the translational movement of the valve, a bar attached to the valve shutter, at least one follower attached to the valve shutter and designed to collaborate with a camway of constant pitch; and control means which are programmed to a linear model, wherein the helical connection comprises the camway, the movement conversion device further comprises a tubular wall in which the camway is formed, the camway comprises an open slot in the tubular wall, the open slot having a first end that limits the translational movement of the valve shutter in one of the open and closed positions, and a second end that limits the translational movement of the valve shutter in the other position, the slot having the shape of a helicoid extending along the tubular wall, the movement conversion device is monolithic, the at least one follower is mounted to rotate on the bar attached to the valve shutter, the bar being arranged in a volume delimited by the tubular wall so as to collaborate with an input wheel which is driven by the rotary actuator and which is designed to rotate the bar, and the at least one follower that is mounted to rotate on the bar is a wheel.

12. The valve as claimed in claim 1, the movement conversion device further comprising a helical torsion spring that returns the valve shutter to the closed position, wherein the helical torsion spring behaves in a substantially linear manner, and wherein the helical torsion spring is disposed about the rotary actuator.

13. The valve as claimed in claim 1, and further comprising:

an input wheel mounted to rotate on the tubular wall and driven by said rotary actuator to rotate the valve shutter.

14. The valve as claimed in claim 11, and further comprising:

an input wheel mounted to rotate on the tubular wall and driven by said rotary actuator to rotate the valve shutter.

* * * * *